US012703594B2

(12) United States Patent
Oishi et al.

(10) Patent No.: US 12,703,594 B2
(45) Date of Patent: Aug. 11, 2026

(54) MEDIUM CONVEYING DEVICE AND IMAGE FORMING APPARATUS

(71) Applicant: FUJIFILM Business Innovation Corp., Tokyo (JP)

(72) Inventors: Ryuga Oishi, Kanagawa (JP); Hiroyuki Tamai, Kanagawa (JP); Ryosuke Yamaji, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/783,600

(22) Filed: Jul. 25, 2024

(65) Prior Publication Data

US 2025/0263256 A1 Aug. 21, 2025

(30) Foreign Application Priority Data

Feb. 19, 2024 (JP) ................................ 2024-023068

(51) Int. Cl.
*B65H 5/06* (2006.01)
*G03G 15/00* (2006.01)

(52) U.S. Cl.
CPC ......... *B65H 5/062* (2013.01); *G03G 15/6529* (2013.01); *B65H 2402/441* (2013.01); *B65H 2402/54* (2013.01); *B65H 2404/142* (2013.01); *B65H 2404/1441* (2013.01)

(58) Field of Classification Search
CPC .............. B65H 5/062; B65H 2402/441; B65H 2404/142; B65H 2404/144; B65H 2404/1441; B65H 2404/1442; G03G 21/1623–1638; G03G 2221/1684; G03G 2221/1687
USPC .................................................. 271/273, 274
See application file for complete search history.

(56) References Cited

U.S. PATENT DOCUMENTS

| | | | | |
|---|---|---|---|---|
| 6,145,828 | A * | 11/2000 | Arai | G03G 15/231 271/186 |
| 6,695,303 | B2 * | 2/2004 | Okada | B65H 5/062 271/9.12 |
| 7,455,294 | B2 * | 11/2008 | Lin | H04N 1/00602 271/264 |
| 7,950,659 | B2 * | 5/2011 | Matsushima | G03G 15/6573 271/264 |
| 8,132,809 | B2 * | 3/2012 | Shiraishi | B65H 1/266 271/273 |
| 9,051,121 | B2 * | 6/2015 | Nagao | B65H 29/125 |

(Continued)

FOREIGN PATENT DOCUMENTS

JP 2014-148379 A 8/2014

*Primary Examiner* — Ernesto A Suarez
(74) *Attorney, Agent, or Firm* — Sughrue Mion, PLLC

(57) ABSTRACT

A medium conveying device includes: a first roller that is rotatably supported; a second roller that conveys a recording medium while nipping the recording medium between the first roller and the second roller; a biasing member that biases the first roller toward the second roller; an attachment member to which the first roller, the second roller, and the biasing member are attached, the attachment member being mounted on and dismounted from a main body together with the first roller, the second roller, and the biasing member; and an adjustment member that changes a posture of the biasing member in conjunction with mounting of the attachment member on the main body to adjust a biasing force applied by the biasing member to the first roller.

10 Claims, 9 Drawing Sheets

(56) References Cited

U.S. PATENT DOCUMENTS

| | | | | |
|---|---|---|---|---|
| 9,706,068 | B2 * | 7/2017 | Kawabata .............. | B65H 5/068 |
| 12,280,980 | B2 * | 4/2025 | Koike .................... | B65H 5/062 |
| 12,589,962 | B2 * | 3/2026 | Oishi ..................... | B65H 5/064 |
| 2011/0278792 | A1 * | 11/2011 | Hasegawa .............. | B65H 5/062<br>271/145 |
| 2015/0266684 | A1 * | 9/2015 | Kawamata ............. | B65H 5/062<br>271/274 |
| 2025/0263258 | A1 * | 8/2025 | Tamai .................... | B65H 5/062 |

* cited by examiner

MEDIUM CONVEYING DEVICE AND IMAGE FORMING APPARATUS

CROSS-REFERENCE TO RELATED APPLICATIONS

This application is based on and claims priority under 35 USC 119 from Japanese Patent Application No. 2024-023068 filed Feb. 19, 2024.

BACKGROUND

(i) Technical Field

The present disclosure relates to a medium conveying device and an image forming apparatus.

(ii) Related Art

Japanese Unexamined Patent Application Publication No. 2014-148379 discloses a recording medium supply device in which a pressing member, disposed at one end portion of a first rotary arm, is configured to press against an uppermost surface of sheet-like recording media placed in a stacked state on a recording medium mounting portion. The recording medium supply device includes a first biasing unit that is movably disposed along a longitudinal direction of the first rotary arm. The first biasing unit applies a pressing force to the pressing member by biasing the first rotary arm in a rotating direction. By moving the first biasing unit, the pressing force applied to the pressing member can be changed.

SUMMARY

In the related art, in order to adjust the force with which a recording medium is nipped, a medium conveying device includes a biasing member and an adjustment member. The biasing member biases a first roller toward a second roller. The adjustment member adjusts a biasing force applied by the biasing member to the first roller.

Such a configuration is provided with an attachment member to which the first roller, the second roller, and the biasing member are attached. The attachment member is configured to be attached to and detached from a main body together with the first roller, the second roller, and the biasing member. With respect to the adjustment member, the adjustment of the biasing force applied by the biasing member to the first roller is completed by an independent operation different from a motion in which the first roller, the second roller, and the biasing member are mounted on the main body.

Aspects of non-limiting embodiments of the present disclosure relate to adjustment of a biasing force applied by a biasing member to a first roller in conjunction with a motion in which the first roller, a second roller, and the biasing member are mounted on a main body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a medium conveying device including: a first roller that is rotatably supported; a second roller that conveys a recording medium while nipping the recording medium between the first roller and the second roller; a biasing member that biases the first roller toward the second roller; an attachment member to which the first roller, the second roller, and the biasing member are attached, the attachment member being mounted on and dismounted from a main body together with the first roller, the second roller, and the biasing member; and an adjustment member that changes a posture of the biasing member in conjunction with mounting of the attachment member on the main body to adjust a biasing force applied by the biasing member to the first roller.

BRIEF DESCRIPTION OF THE DRAWINGS

Exemplary embodiments of the present disclosure will be described in detail based on the following figures, wherein.

DETAILED DESCRIPTION

Examples of a medium conveying device and an image forming apparatus according to an exemplary embodiment of the present disclosure will be described with reference to FIG. 1 to FIG. 9. In each of the drawings, an arrow H indicates a vertical direction, that is, an up-down direction, an arrow W is orthogonal to the arrow H and indicates a horizontal direction, that is, a width direction, and an arrow D is orthogonal to the arrow H and the arrow W and indicates a horizontal direction, that is, a depth direction.

(Overall Configuration of Image Forming Apparatus 10)

Figure 1:
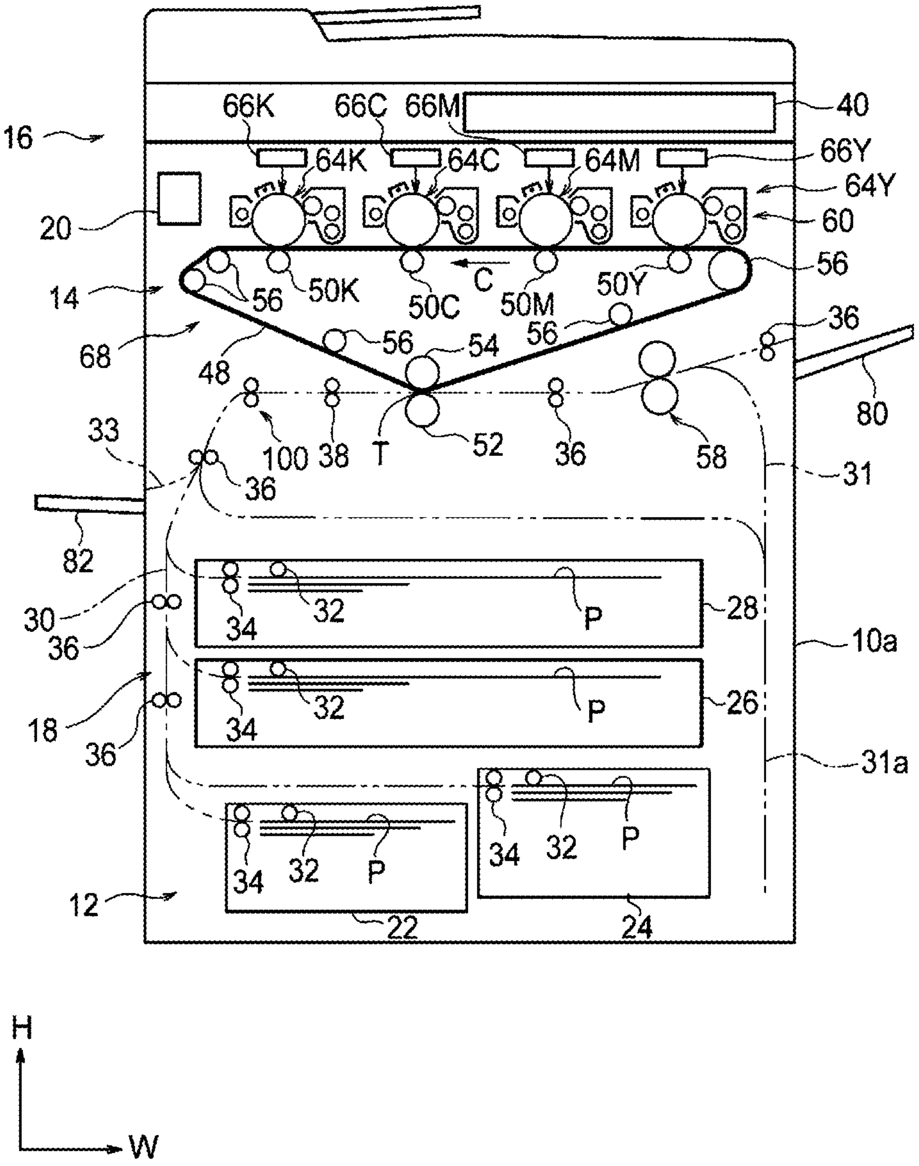
FIG. 1 is a configuration diagram schematically illustrating an image forming apparatus according to an exemplary embodiment of the present disclosure.

As illustrated in FIG. 1, an image forming apparatus 10 includes a sheet accommodation section 12, a main operation section 14, a document reading section 16, and a display section 40 that are arranged in this order from the lower side to the upper side in the up-down direction. The image forming apparatus 10 further includes a conveying section 18 and a manager 20. The conveying section 18 conveys sheet members P as recording media. The manager 20 manages the motion of each section.

The sheet accommodation section 12 accommodates the sheet members P. The main operation section 14 forms an image on each sheet member P conveyed from the sheet accommodation section 12. The document reading section 16 reads an image on a document. The display section 40 shows a screen where a user interacts with the image forming apparatus 10 to exchange information.

[Sheet Accommodation Section 12]

As illustrated in FIG. 1, the sheet accommodation section 12 includes a first accommodation section 22, a second accommodation section 24, a third accommodation section 26, and a fourth accommodation section 28 that are capable of accommodating sheet members P of different sizes. The first accommodation section 22, the second accommodation section 24, the third accommodation section 26, and the fourth accommodation section 28 each include a feed roller 32 and a multi feeding prevention roller 34. The feed roller 32 feeds the accommodated sheet members P one by one. The multi feeding prevention roller 34 conveys the fed sheet members P one by one to a conveying path 30 in the image forming apparatus 10.

[Conveying Section 18]

As illustrated in FIG. 1, the conveying section 18 includes a plurality of conveying rollers 36 that receive sheet members P from the multi feeding prevention roller 34 and convey the sheet members P one by one along the conveying path 30. The conveying section 18 further includes an alignment roller 38 disposed upstream of a transfer position T, which will be described later, in a conveying direction of the sheet members P (hereinafter, simply referred to as a “sheet conveying direction”). The alignment roller 38 temporarily stops each sheet member P, and feeds the sheet member P to a second transfer position at a predetermined timing. The conveying section 18 further includes a medium conveying device 100 that receives each sheet member P from the conveying rollers 36 and delivers the sheet member P to the alignment roller 38.

An upstream portion of the conveying path 30 in the sheet conveying direction extends upward from below on one side in the width direction. A downstream portion of the conveying path 30 in the sheet conveying direction extends from one side to the other side in the width direction, and reaches a discharge section 80 through which the sheet members P are discharged to the outside of an apparatus main body 10*a*. The medium conveying device 100, described above, is disposed at an end portion of a transition portion of the conveying path 30 where the conveying direction of the sheet members P changes. The medium conveying device 100 will be described in detail later.

A duplex conveying path 31 is connected to a downstream end portion of the conveying path 30 in the sheet conveying direction. Each sheet member P is conveyed and reversed along the duplex conveying path 31 so that an image is formed on the reverse side of the sheet member P.

The duplex conveying path 31 includes a switchback path 31*a*. Each sheet member P fed from the switchback path 31*a* is reversed upside down and is fed to an upper end portion of the upstream portion of the conveying path 30 in the sheet conveying direction.

A manual feed path 33 is connected to the upper end portion of the upstream portion of the conveying path 30 in the sheet conveying direction. A sheet member P supplied from a manual feed section 82 disposed outside the apparatus main body 10*a* is conveyed along the manual feed path 33.

[Main Operation Section 14]

As illustrated in FIG. 1, the main operation section 14 includes an image forming section 60, a transfer unit 68, and a fixing device 58. The image forming section 60 forms a toner image. The transfer unit 68 transfers the toner image onto each sheet member P. The fixing device 58 fixes the toner image formed on the sheet member P to the sheet member P.

—Image Forming Section 60—

The image forming section 60 includes image forming units 64K, 64C, 64M, and 64Y that form toner images of black (K), cyan (C), magenta (M), and yellow (Y), respectively. In the following description, in a case where the image forming units 64K, 64C, 64M, and 64Y are not particularly distinguished from one another, K, C, M, and Y, each of which is added at the end of the reference numeral, may be omitted in some cases.

Figure 2:
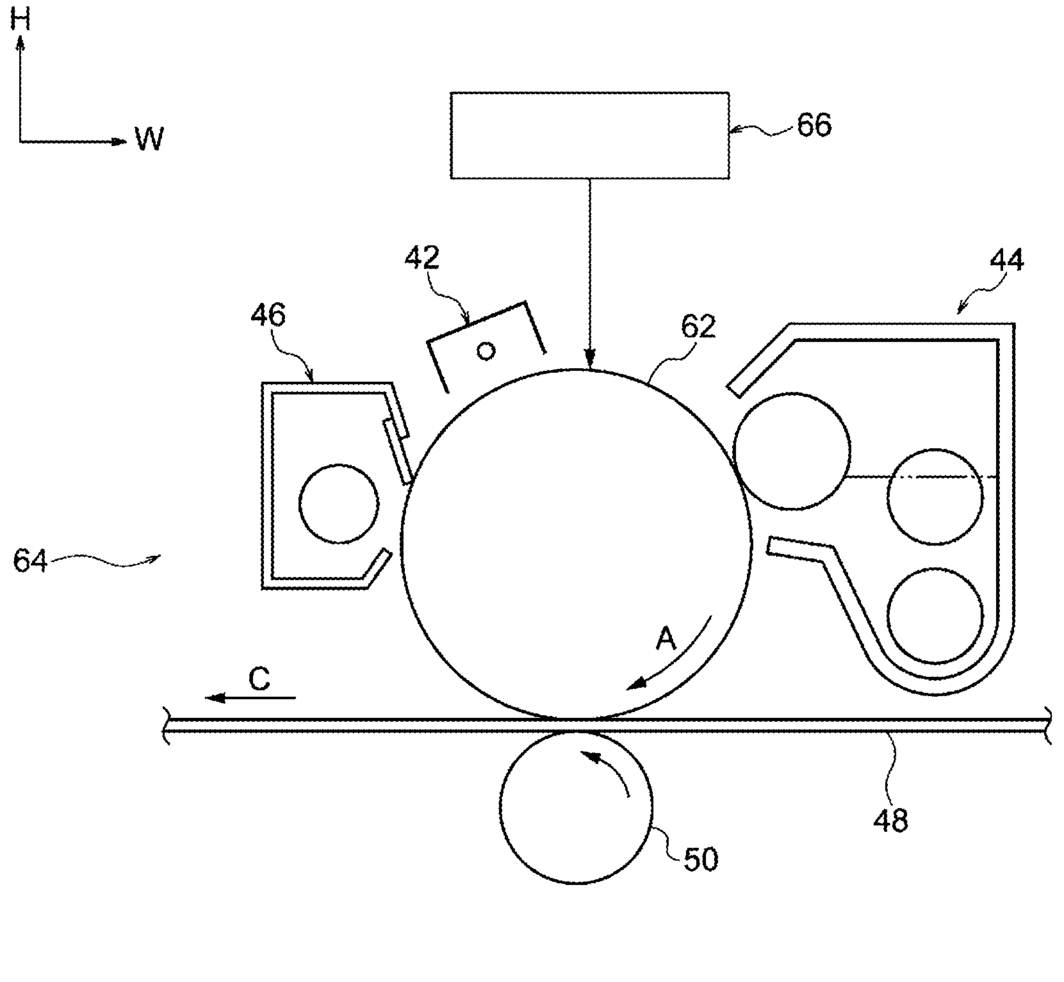
FIG. 2 is a configuration diagram schematically illustrating an image forming unit included in the image forming apparatus according to the exemplary embodiment of the present disclosure.

As illustrated in FIG. 2, each image forming unit 64 includes a photoconductor drum 62, a charger 42, a developer 44, and a cleaning member 46. The photoconductor drum 62 has a cylindrical shape and rotates in a direction indicated by an arrow A in FIG. 2. The charger 42 charges the photoconductor drum 62. The developer 44 develops an electrostatic latent image, which will be described later, to visualize the electrostatic latent image as a toner image.

The image forming section 60 further includes exposure devices 66K, 66C, 66M, and 66Y (see FIG. 1) each of which irradiates a corresponding one of the photoconductor drums 62 charged by the charger 42 with exposure light to form an electrostatic latent image.

In this configuration, the charger 42 charges the rotating photoconductor drum 62, and the exposure device 66 irradiates the charged photoconductor drum 62 with exposure light to form an electrostatic latent image. In addition, the developer 44 develops the electrostatic latent image to visualize the electrostatic latent image as a toner image.

—Transfer Unit 68—

As illustrated in FIG. 1, the transfer unit 68 includes a transfer belt 48, first transfer rollers 50, and a second transfer roller 52. The transfer belt 48 has an endless shape. Each first transfer roller 50 transfers a toner image from the corresponding photoconductor drum 62 (see FIG. 2) onto the transfer belt 48. The second transfer roller 52 transfers the toner images on the transfer belt 48 onto each sheet member P. The transfer unit 68 further includes an auxiliary roller 54 and a plurality of rollers 56. The auxiliary roller 54 is disposed on a side opposite to the second transfer roller 52 with the transfer belt 48 sandwiched therebetween. The transfer belt 48 is wound around the plurality of rollers 56.

The transfer belt 48 has a triangular shape with a vertex facing downward when viewed from the depth direction. The photoconductor drums 62 and the first transfer rollers 50 sandwich a base of the triangular shape of the transfer belt 48. In addition, the second transfer roller 52 and the auxiliary roller 54 sandwich the vertex portion of the triangular shape of the transfer belt 48.

One of the plurality of rollers 56 functions as a drive roller that drives the transfer belt 48 to move in a continuous loop in a direction indicated by an arrow C in FIG. 1.

(Action of Image Forming Apparatus)

The image forming apparatus 10 forms an image in the following manner.

First, the chargers 42 for the respective colors illustrated in FIG. 2 uniformly negatively charge surfaces of the rotating photoconductor drums 62 for the respective colors at a predetermined potential. Subsequently, the exposure devices 66 (see FIG. 1) for the respective colors irradiate the charged surfaces of the photoconductor drums 62 for the respective colors with exposure light to form electrostatic latent images on the basis of image data read by the document reading section 16 (see FIG. 1).

As a result, the electrostatic latent images corresponding to the image data are formed on the surfaces of the photoconductor drums 62 for the respective colors. The developers 44 for the respective colors develop the electrostatic latent images to visualize the electrostatic latent images as toner images. The toner images formed on the surfaces of the photoconductor drums 62 for the respective colors are sequentially transferred onto the transfer belt 48 by the first transfer rollers 50.

Each sheet member P, which is fed from one of the first accommodation section 22, the second accommodation section 24, the third accommodation section 26, and the fourth accommodation section 28 illustrated in FIG. 1 to the conveying path 30 by the corresponding feed roller 32, is fed to the transfer position T where the transfer belt 48 and the second transfer roller 52 are in contact with each other. When the sheet member P is conveyed between the transfer belt 48 and the second transfer roller 52 at the transfer position T, the toner images on the transfer belt 48 are transferred onto the sheet member P.

The fixing device 58 fixes the toner images transferred onto the sheet member P to the sheet member P. Then, the sheet member P to which the toner images have been fixed is discharged to the discharge section 80 disposed outside the apparatus main body 10*a*.

(Configuration of Main Part)

Next, the medium conveying device 100 will be described.

As illustrated in FIG. 1, the medium conveying device 100 is disposed at the end portion of the transition portion of the conveying path 30 where the conveying direction of the sheet members P changes. In other words, when viewed from the depth direction, the medium conveying device 100 is disposed at a portion that connects a portion where the conveying path 30 is curved and a portion where the conveying path 30 extends in the width direction. Thus, the medium conveying device 100 is disposed at a portion where it is necessary for the medium conveying device 100 to increase a nipping force with respect to the recording medium when conveying thick paper and plain paper as the recording medium, and where, when conveying thin paper with a nipping force as that for thick paper and plain paper, wrinkles or roll marks are formed on the thin paper.

Most components of the medium conveying device 100 can be mounted on and dismounted from the apparatus main body 10*a* of the image forming apparatus 10 in the depth direction. Specifically, when a user opens an opening/closing cover (not illustrated) provided in the image forming apparatus 10 and pulls out the medium conveying device 100 to the near side in the depth direction, most components of the medium conveying device 100 are dismounted from the apparatus main body 10*a*.

Figure 3:
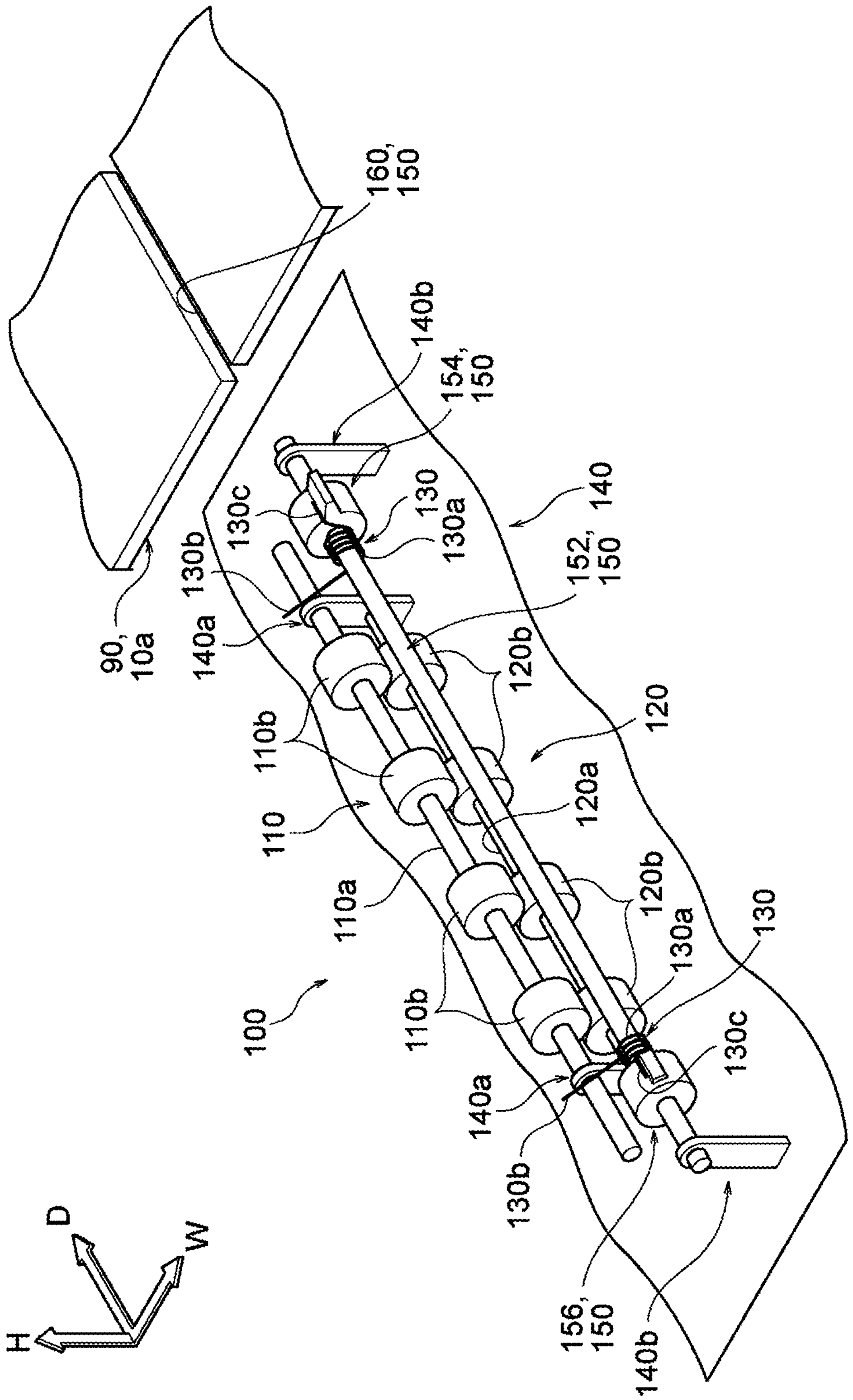
FIG. 3 is a perspective view illustrating an entire medium conveying device according to the exemplary embodiment of the present disclosure.

FIG. 3 illustrates a state where the medium conveying device 100 is dismounted from the apparatus main body 10*a*. As illustrated in FIG. 3, components of the medium conveying device 100 dismounted from the apparatus main body 10*a* include a pair of rollers 110 and 120, and biasing members 130 that bias the roller 110 toward the roller 120. In addition, components of the medium conveying device 100 dismounted from the apparatus main body 10*a* include an attachment member 140, to which rollers 110 and 120 and the biasing members 130 are attached, and portions of adjustment member 150. The attachment member 140 is mounted on and dismounted from the apparatus main body 10*a* together with the rollers 110 and 120 and the biasing members 130. The adjustment member 150 adjusts a biasing force applied by the biasing members 130 to the roller 110.

[Roller 110 and Roller 120]

As illustrated in FIG. 3, the roller 110 and the roller 120 are arranged in the up-down direction, and the roller 110 is disposed on the upper side with respect to the roller 120. The medium conveying device 100 is configured to convey each recording medium while nipping the recording medium between the roller 110 and the roller 120. The roller 110 is an example of a first roller, and the roller 120 is an example of a second roller.

—Roller 110—

The roller 110 includes a shaft portion 110*a* extending in the depth direction and a plurality of roller portions 110*b* attached to the shaft portion 110*a*. An axial direction of the shaft portion 110*a* is aligned with the depth direction. Each roller portion 110*b* is made of an elastic material or a resin material and has a sleeve shape. In the present exemplary embodiment, as an example, four roller portions 110*b* are provided and attached to the shaft portion 110*a* at intervals in the depth direction. The roller 110 is supported by support portions 140*a* formed in the attachment member 140 so as to be movable in the up-down direction and rotatable about its axis. In this manner, the roller 110 functions as a driven roller.

—Roller 120—

The roller 120 includes a shaft portion 120*a* extending in the depth direction and a plurality of roller portions 120*b* attached to the shaft portion 120*a*. An axial direction of the shaft portion 120*a* is aligned with the depth direction. Each roller portion 120*b* is made of an elastic material or a resin material and has a sleeve shape. In the present exemplary embodiment, as an example, four roller portions 120*b* are provided and attached to the shaft portion 120*a* at intervals in the depth direction. The roller 120 is supported by the support portions 140*a* formed in the attachment member 140 so as to rotate by a driving force transmitted from a driving source (not illustrated). In this manner, the roller 120 functions as a drive roller.

[Biasing Member 130]

The biasing members 130 are torsion springs, each disposed at one of both end portions of the roller 110 in the depth direction, on the other side (right side in FIG. 3) in the width direction with respect to the roller 110. Each biasing member 130 includes a spiral portion 130*a* having a spiral shape, a first end portion 130*b*, and a second end portion 130*c*. The first end portion 130*b* protrudes from one end of the spiral portion 130*a* and presses against the roller 110. The second end portion 130*c* protrudes from the other end of the spiral portion 130*a*.

An axial direction of the spiral portion 130*a* is aligned with the depth direction, and the first end portion 130*b* extends linearly and is in contact with the shaft portion 110*a* of the roller 110 from above.

In this configuration, each biasing member 130 biases the roller 110 toward the roller 120 from above in the up-down direction. The up-down direction is an example of a biasing direction.

[Adjustment Member 150]

As illustrated in FIG. 3, the adjustment member 150 includes a shaft portion 152 and support portions 154 and 156. The shaft portion 152 extends along the axial direction (depth direction) of the roller 110, and the spiral portions 130*a* are wound around the shaft portion 152. The support portions 154 and 156 are each attached to the shaft portion

152 and support respective one of the second end portions 130*c*. The adjustment member 150 further includes a slit 160. When the attachment member 140 dismounted from the apparatus main body 10*a* is mounted on the apparatus main body 10*a*, the slit 160 comes into contact with the support portion 154 and changes the posture of the support portion 154 to change the posture of the biasing members 130. The apparatus main body 10*a* is an example of a main body.

—Shaft Portion 152—

As illustrated in FIG. 3, the shaft portion 152 is disposed on the other side in the width direction with respect to the roller 110. The shaft portion 152 is supported by support portions 140*b* formed in the attachment member 140 so as to be rotatable about its axis.

—Support Portions 154 and 156—

As illustrated in FIG. 3, the support portion 154 is attached to a portion of the shaft portion 152 on the far side in the depth direction, and is disposed on the outer side of the spiral portion 130*a* in the depth direction. Here, the phrase "the outer side in the depth direction" refers to a side away from the center of the medium conveying device 100 in the depth direction.

Figure 4:
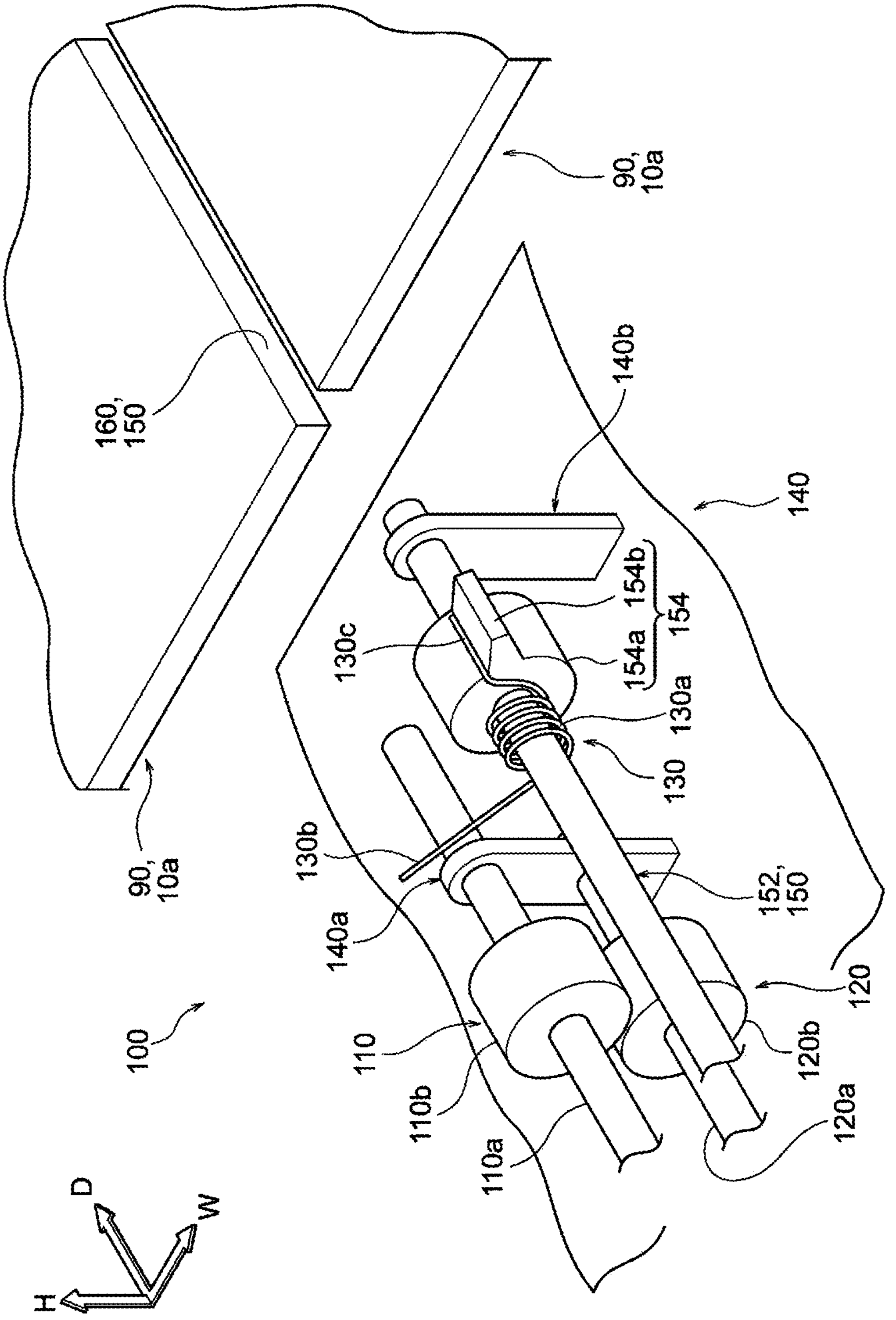
FIG. 4 is an enlarged perspective view illustrating a portion of the medium conveying device, according to the exemplary embodiment of the present disclosure, on a far side in a depth direction.

As illustrated in FIG. 4, the support portion 154 includes a sleeve portion 154*a* and a protruding portion 154*b*. The sleeve portion 154*a* has a sleeve shape that circumferentially covers the shaft portion 152. The protruding portion 154*b* protrudes from the outer peripheral surface of the sleeve portion 154*a* in the radial direction of the shaft portion 152. The support portion 154 is attached to the shaft portion 152 such that when the support portion 154 rotates in the circumferential direction of the shaft portion 152, the shaft portion 152 also rotates.

In addition, the second end portion 130*c* of the biasing member 130 is caught on the protruding portion 154*b*. In a state where no external force is applied to the biasing member 130, the protruding portion 154*b* is inclined with respect to the width direction such that the protruding portion 154*b* is located on a side opposite to the roller 110 with the shaft portion 152 interposed therebetween, and a distal end of the protruding portion 154*b* is located above a proximal end (see a two-dot chain line in FIG. 6).

As illustrated in FIG. 3, the support portion 156 is attached to a portion of the shaft portion 152 on the near side in the depth direction, and is disposed on the outer side of the spiral portion 130*a* in the depth direction.

Figure 5:
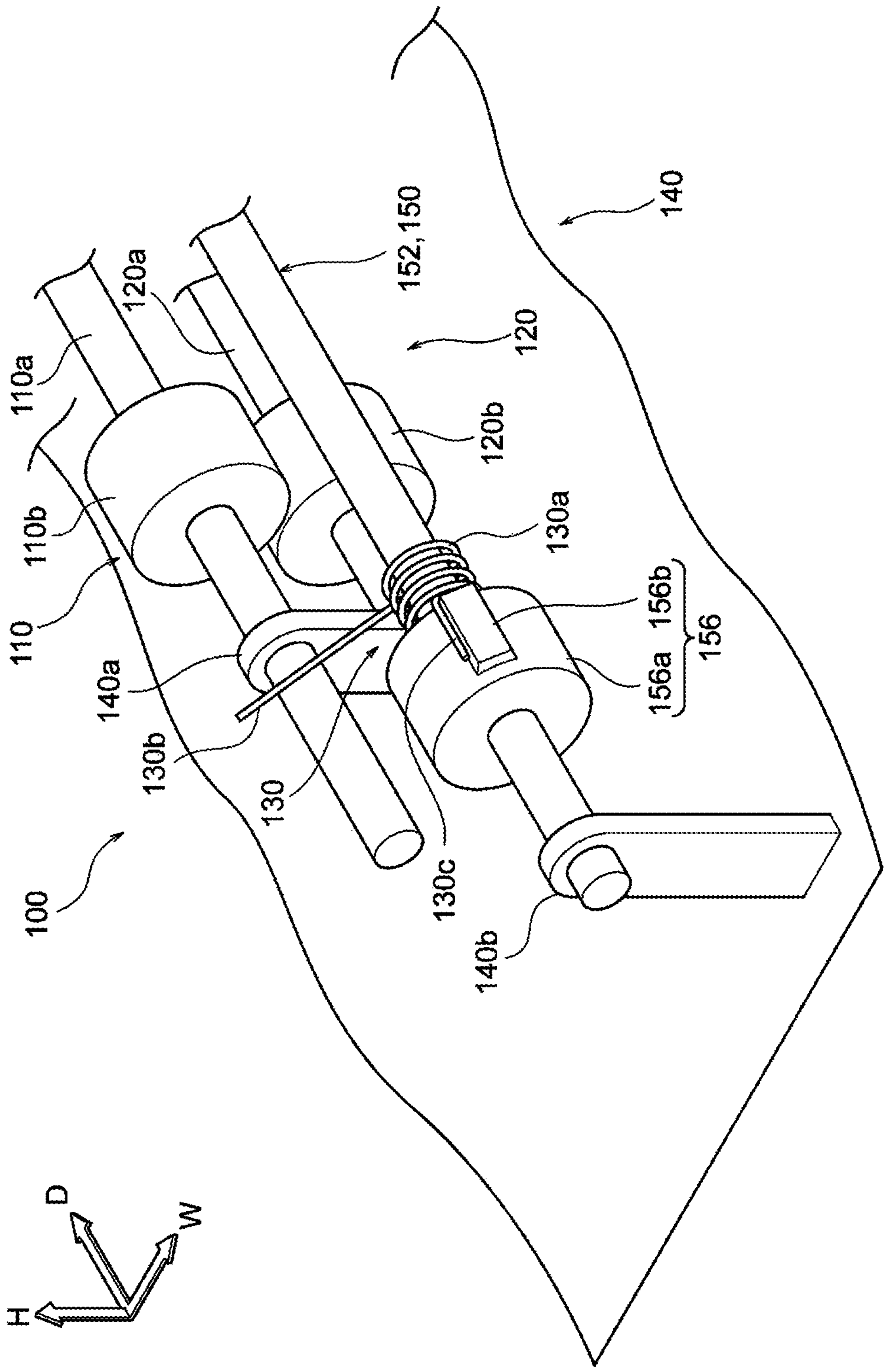
FIG. 5 is an enlarged perspective view illustrating a portion of the medium conveying device, according to the exemplary embodiment of the present disclosure, on a near side in the depth direction.

As illustrated in FIG. 5, the support portion 156 includes a sleeve portion 156*a* and a protruding portion 156*b*. The sleeve portion 156*a* has a sleeve shape that circumferentially covers the shaft portion 152. The protruding portion 156*b* protrudes from the outer peripheral surface of the sleeve portion 156*a* in the radial direction of the shaft portion 152. The support portion 156 is attached to the shaft portion 152 such that when the support portion 156 rotates in the circumferential direction of the shaft portion 152, the shaft portion 152 also rotates.

In addition, the second end portion 130*c* of the biasing member 130 is caught on the protruding portion 156*b*. Here, the height of the protruding portion 156*b* is set much lower than the height of the protruding portion 154*b* (see FIG. 4), and the protruding portion 156*b* has a height that only allows the protruding portion 156*b* to catch the second end portion 130*c* thereon. In other words, the height of the protruding portion 154*b* of the support portion 154 illustrated in FIG. 4 is much higher than the height of the protruding portion 156*b* illustrated in FIG. 5.

—Slit 160—

As illustrated in FIG. 3, the slit 160 is formed in an inner cover 90 attached to the apparatus main body 10*a*. The slit 160 is an example of a contact portion.

The portion of the inner cover 90 in which the slit 160 is formed has a plate shape, and is disposed above the rollers 110 and 120 in a state where the medium conveying device 100 is mounted on the apparatus main body 10*a*.

Figure 8A:
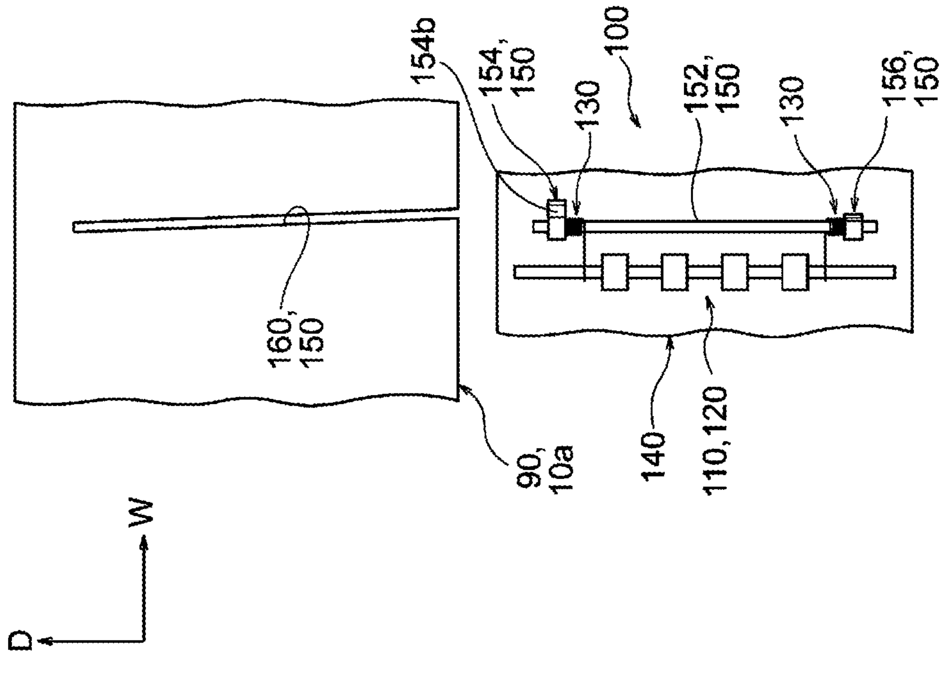
FIGS. 8A and 8B are motion diagrams illustrating a motion of the medium conveying device according to the exemplary embodiment of the present disclosure.

The slit 160 is formed to penetrate through the inner cover 90 from the front surface to the rear surface. As illustrated in FIG. 8A, the slit 160 is linear as viewed from above, extends in the depth direction, and is inclined with respect to the depth direction. Specifically, a near side portion of the slit 160 in the depth direction is located on the other side in the width direction relative to a far side portion of the slit 160 in the depth direction.

Figure 6:
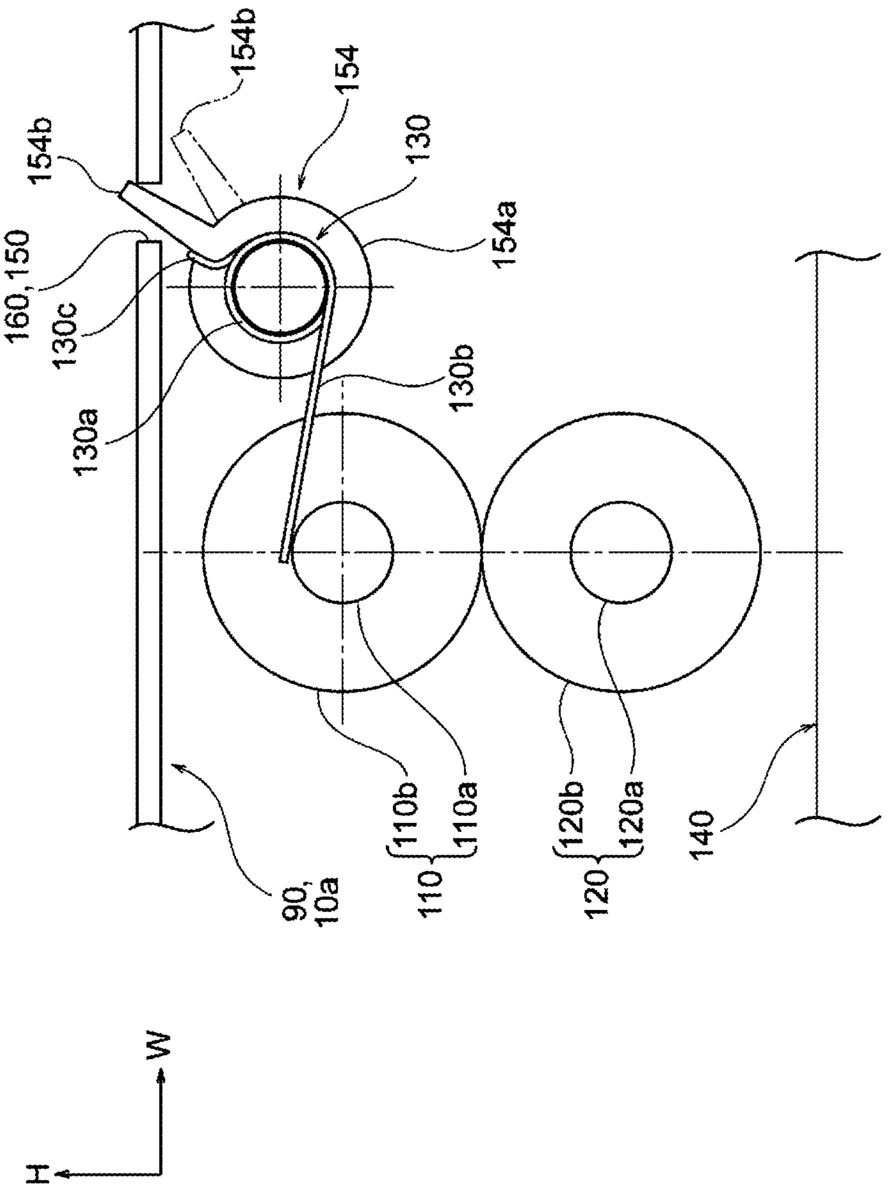
FIG. 6 is a front view used to describe a motion of the medium conveying device according to the exemplary embodiment of the present disclosure.

When the medium conveying device 100, which is in a state of being dismounted from the apparatus main body 10*a*, is mounted on the apparatus main body 10*a*, a user inserts the protruding portion 154*b* into the slit 160 by pinching the protruding portion 154*b* of the support portion 154 illustrated in FIGS. 4 and 6, and rotating the support portion 154 in the circumferential direction of the shaft portion 152. On the other hand, when the medium conveying device 100, which is in a state of being dismounted from the apparatus main body 10*a*, is mounted on the apparatus main body 10*a*, if no load is applied to the protruding portion 154*b* of the support portion 154, the distal end of the protruding portion 154*b* is located below a lower surface of the inner cover 90 (see the two-dot chain line in FIG. 6).

The motion of the medium conveying device 100 when the user has inserted the protruding portion 154*b* into the slit 160 will be described together with the action described below.

(Action)

Next, the action of the medium conveying device 100 will be described.

As illustrated in FIG. 6, in a case where the medium conveying device 100 conveys thin paper as a recording medium, a user positions the protruding portion 154*b* of the support portion 154 below the lower surface of the inner cover 90 without inserting the protruding portion 154*b* into the slit 160 (see the two-dot chain line in FIG. 6).

With such an arrangement, the biasing force generated when the biasing member 130, which is a torsion spring, is twisted in the circumferential direction of the shaft portion 152 is not applied to the roller 110. Therefore, the force with which the recording medium is nipped between the roller 110 and the roller 120 becomes weaker. In this state, the medium conveying device 100 conveys thin paper as a recording medium.

On the other hand, in a case where the medium conveying device 100 conveys thick paper and plain paper as a recording medium, a user inserts the protruding portion 154*b* of the support portion 154 into the slit 160 as illustrated in FIG. 6 (see a solid line in FIG. 6). Hereinafter, a motion in which a user inserts the protruding portion 154*b* into the slit 160 in a case where the protruding portion 154*b* is not inserted into the slit 160 in a state where the medium conveying device 100 is mounted on the apparatus main body 10*a* will be described.

First, the user dismounts the medium conveying device 100, which has been mounted on the apparatus main body 10*a*, from the apparatus main body 10*a* (see FIG. 3). Specifically, as illustrated in FIG. 3, the user dismounts the medium conveying device 100 from the apparatus main body 10*a*, by moving the attachment member 140, to which the rollers 110 and 120, the biasing members 130, and the like, are attached, to the near side in the depth direction.

Then, the user mounts the dismounted medium conveying device 100 on the apparatus main body 10*a* by moving the dismounted medium conveying device 100 to the far side in the depth direction. Specifically, the user inserts the protruding portion 154*b* into an inlet (the near side portion in the depth direction) of the slit 160 as illustrated in FIGS. 8A and 8B, by pinching the protruding portion 154*b* of the support portion 154 illustrated in FIGS. 4 and 6, and rotating the support portion 154 in the circumferential direction of the shaft portion 152.

Figure 8B:
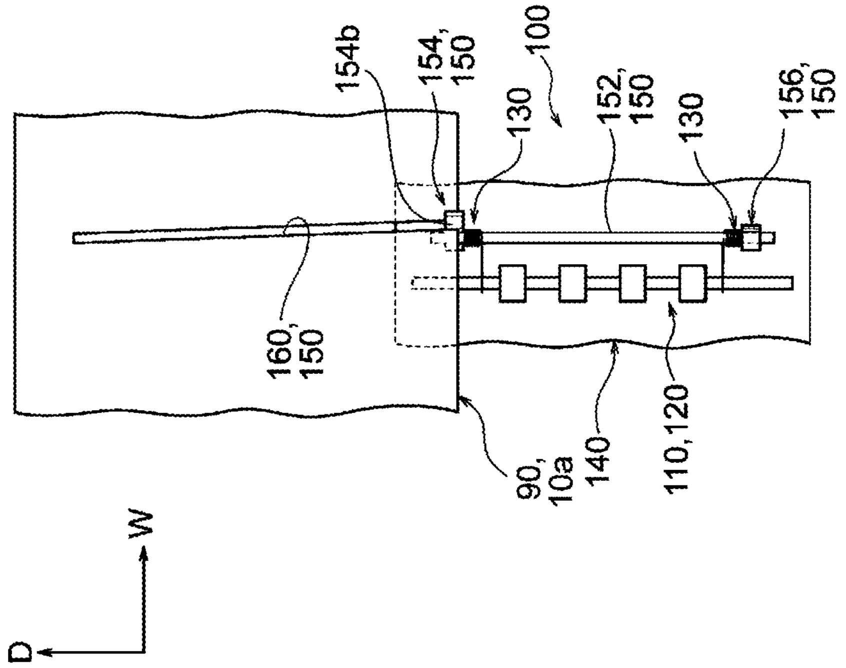
Figure 9B:
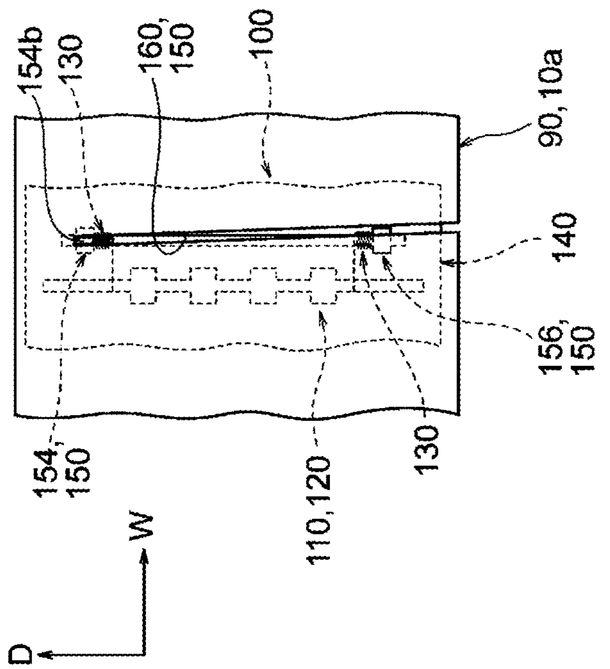
FIGS. 9A and 9B are motion diagrams illustrating a motion of the medium conveying device according to the exemplary embodiment of the present disclosure.
Figure 9A:
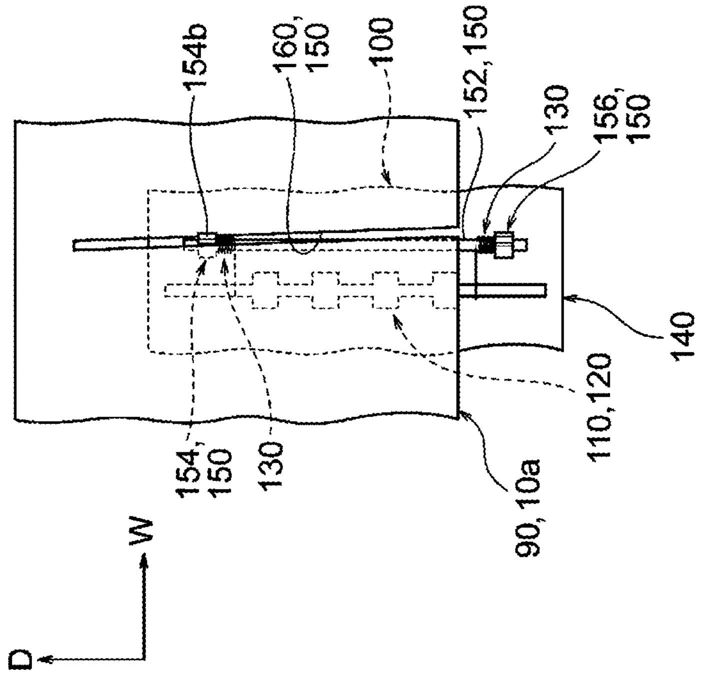

Then, in a state where the protruding portion 154*b* is inserted into the inlet of the slit 160, the user moves the attachment member 140, to which rollers 110 and 120, the biasing members 130, and the like, are attached, to the far side in the depth direction as illustrated in FIGS. 8B, 9A, and 9B. As a result, the medium conveying device 100 is mounted on the apparatus main body 10*a*.

Specifically, by moving the attachment member 140 to the far side in the depth direction, the support portion 154, in which the protruding portion 154*b* inserted into the slit 160 is formed, also moves to the far side in the depth direction. As a result, the protruding portion 154*b* moves to one side in the width direction along the slit 160 that is inclined with respect to the depth direction.

Figure 7:
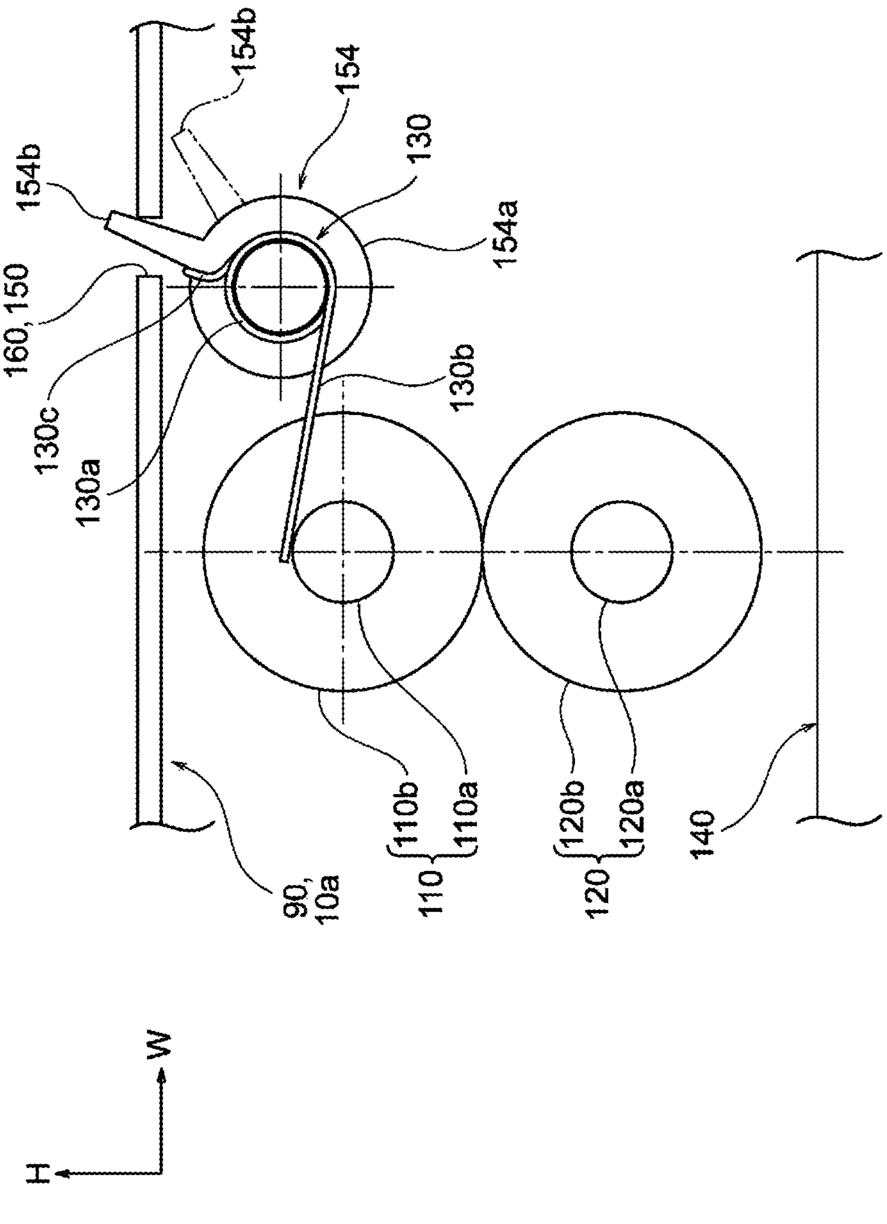
FIG. 7 is a front view used to describe a motion of the medium conveying device according to the exemplary embodiment of the present disclosure.

When the protruding portion 154*b* moves to one side in the width direction, the support portion 154 rotates counterclockwise as illustrated in FIGS. 6 and 7. When the support portion 154 rotates, the rotational force is transmitted to the support portion 156 via the shaft portion 152, and the support portion 156 also rotates. Then, the rotation of the support portions 154 and 156 causes the pair of biasing members 130 to rotate in the circumferential direction of the shaft portion 152.

As a result, the biasing members 130 bias the roller 110 toward the roller 120 via the first end portions 130*b*, and the force with which the recording medium is nipped between the roller 110 and the roller 120 increases. In other words, in the medium conveying device 100, the biasing force applied when the biasing members 130 bias the roller 110 toward the roller 120 increases in conjunction with the mounting of the medium conveying device 100, which is in a state of being dismounted from the apparatus main body 10*a*, on the apparatus main body 10*a*. In this state, the medium conveying device 100 conveys thick paper or plain paper as a recording medium.

(Recapitulation)

As described above, in the medium conveying device 100, the biasing force applied when the biasing members 130 bias the roller 110 toward the roller 120 increases in conjunction with the mounting of the medium conveying device 100, which is in a state of being dismounted from the apparatus main body 10*a*, on the apparatus main body 10*a*. In this manner, the biasing force applied by the biasing members 130 to the roller 110 is adjusted in conjunction with the motion in which the medium conveying device 100 is mounted on the apparatus main body 10*a*.

Furthermore, in the medium conveying device 100, the slit 160 comes into contact with the protruding portion 154*b* of the support portion 154 and changes the posture of the support portion 154 to change the posture of the biasing members 130. Thus, the posture of the biasing members 130, which are torsion springs, are changed without using electric power, and the biasing force applied by the biasing members 130 to the roller 110 is adjusted by the adjustment member 150.

Furthermore, in the medium conveying device 100, the slit 160 comes into contact with the protruding portion 154*b* of the support portion 154 and changes the posture of the support portion 154. Thus, operation is facilitated compared to a case where the slit comes into contact with a support portion that is a portion recessed in a radial direction of the shaft portion and changes the posture of the support portion.

In the medium conveying device 100, the biasing members 130 are torsion springs each including the spiral portion 130*a* having a spiral shape, the first end portion 130*b*, and the second end portion 130*c*. The spiral portion 130*a* is disposed away from the roller 110 in an intersecting direction (width direction) intersecting the biasing direction (up-down direction) in which the biasing members 130 bias the roller 110 toward the roller 120 when viewed from the axial direction (depth direction) of the roller 110. This prevents the enlargement of the device in the biasing direction compared to a case where the biasing member is disposed on a side opposite to the roller 120 with the roller 110 interposed therebetween in the biasing direction (up-down direction).

In addition, in the medium conveying device 100, by moving the second end portion 130*c* in the circumferential direction of the spiral portion 130*a*, the spiral portion 130 moves in the circumferential direction. Thus, the spiral portion 130*a* moves in the circumferential direction with a smaller force compared to a case where the spiral portion itself is moved in the circumferential direction.

In addition, in the image forming apparatus 10, the operation is simplified compared to a case where the adjustment of the biasing force applied by the biasing members to the roller is completed only by an independent operation.

The present disclosure has been described in detail with respect to a specific exemplary embodiment, but the present disclosure is not limited to the exemplary embodiment, and it is apparent to those skilled in the art that the present disclosure can adopt various other exemplary embodiments within the scope of the present disclosure. For example, in the above-described exemplary embodiment, the medium conveying device 100 is used in the image forming apparatus 10. However, the medium conveying device 100 may be used in a pre-processing device of the image forming apparatus, a post-processing device of the image forming apparatus, a ticketing machine that conveys and sells tickets, an ATM that conveys and dispenses or accepts bills, and the like.

In the above-described exemplary embodiment, the roller 110 and the roller 120 are arranged in the up-down direction, but may be arranged in a direction inclined with respect to the up-down direction.

Although not particularly described in the above-described exemplary embodiment, displaying the type of paper of the recording medium to be used on the display section 40 (see FIG. 1) may accordingly allow a user to insert the protruding portion 154*b* into the slit 160.

Although not particularly described in the above-described exemplary embodiment, in order to ensure a minimum nipping force for nipping the recording medium between the roller 110 and the roller 120, an additional biasing member may be provided separately from the biasing members 130.

In the above-described exemplary embodiment, the protruding portion 154*b* is moved by using the slit 160, but may be moved by using a guide protrusion or the like.

In the above-described exemplary embodiment, the number of slits 160 is one, but a plurality of slits 160 may be provided. In this case, the biasing force generated by the biasing members 130 is adjusted in stages.

In the above-described exemplary embodiment, the number of biasing members 130 is two, but may be one, three, or more. In this case, it is desirable to arrange the biasing members 130 symmetrically with respect to the center of the roller.

In the above-described exemplary embodiment, the biasing members 130 are torsion springs, but may be coil springs. In this case, the effect achieved by the torsion spring is not achieved.

APPENDIX (((1)))

A medium conveying device comprising:

a first roller that is rotatably supported;

a second roller that conveys a recording medium while nipping the recording medium between the first roller and the second roller;

a biasing member that biases the first roller toward the second roller;

an attachment member to which the first roller, the second roller, and the biasing member are attached, the attachment member being mounted on and dismounted from a main body together with the first roller, the second roller, and the biasing member; and an adjustment member that changes a posture of the biasing member in conjunction with mounting of the attachment member on the main body to adjust a biasing force applied by the biasing member to the first roller.

(((2)))

The medium conveying device according to (((1))), wherein the biasing member is a torsion spring including a spiral portion having a spiral shape, a first end portion, and a second end portion, the first end portion protrudes from one end of the spiral portion and presses against the first roller, and the second end portion protrudes from another end of the spiral portion, and the adjustment member includes a shaft portion, a support portion, and a contact portion, the shaft portion extends along an axial direction of the first roller and the spiral portion is wound around the shaft portion, the support portion is attached to the shaft portion and supports the second end portion, and the contact portion is provided in the main body and when the attachment member dismounted from the main body is mounted on the main body, the contact portion comes into contact with the support portion and changes a posture of the support portion to change the posture of the biasing member.

(((3))

The medium conveying device according to (((2))), wherein the support portion is formed with a protruding portion that protrudes in a radial direction of the shaft portion and supports the second end portion, and the contact portion comes into contact with the protruding portion and changes the posture of the support portion.

(((4)))

The medium conveying device according to (((1))), wherein the biasing member is a torsion spring including a spiral portion having a spiral shape and a first end portion, the spiral portion is disposed away from the first roller in an intersecting direction intersecting a biasing direction in which the biasing member biases the first roller when viewed from an axial direction of the first roller, and the first end portion protrudes from one end of the spiral portion and presses against the first roller.

(((5)))

The medium conveying device according to (((4))), wherein the biasing member includes a second end portion that protrudes from another end of the spiral portion, and the adjustment member moves the second end portion in a circumferential direction of the spiral portion to move the spiral portion in the circumferential direction.

(((6)))

An image forming apparatus, comprising:

the medium conveying device according to any one of (((1)) to (5))); and an image forming section that forms an image on a recording medium conveyed by the medium conveying device.

What is claimed is:

1. A medium conveying device comprising:

a first roller that is rotatably supported;

a second roller that conveys a recording medium while nipping the recording medium between the first roller and the second roller;

a biasing member that biases the first roller toward the second roller;

an attachment member to which the first roller, the second roller, and the biasing member are attached, the attachment member being mounted on and dismounted from a main body together with the first roller, the second roller, and the biasing member; and an adjustment member that changes a posture of the biasing member in conjunction with mounting of the attachment member on the main body to adjust a biasing force applied by the biasing member to the first roller.

2. The medium conveying device according to claim 1, wherein the biasing member is a torsion spring including a spiral portion having a spiral shape, a first end portion, and a second end portion, the first end portion protrudes from one end of the spiral portion and presses against the first roller, and the second end portion protrudes from another end of the spiral portion, and the adjustment member includes a shaft portion, a support portion, and a contact portion, the shaft portion extends along an axial direction of the first roller and the spiral portion is wound around the shaft portion, the support portion is attached to the shaft portion and supports the second end portion, and the contact portion is provided in the main body and when the attachment member dismounted from the main body is mounted on the main body, the contact portion comes into contact with the support portion and changes a posture of the support portion to change the posture of the biasing member.

3. The medium conveying device according to claim 2, wherein the support portion is formed with a protruding portion that protrudes in a radial direction of the shaft portion and supports the second end portion, and the contact portion comes into contact with the protruding portion and changes the posture of the support portion.

4. An image forming apparatus, comprising:

the medium conveying device according to claim 3; and an image forming section that forms an image on a recording medium conveyed by the medium conveying device.

5. An image forming apparatus, comprising:

the medium conveying device according to claim 2; and an image forming section that forms an image on a recording medium conveyed by the medium conveying device.

6. An image forming apparatus, comprising:

the medium conveying device according to claim 1; and an image forming section that forms an image on a recording medium conveyed by the medium conveying device.

7. The medium conveying device according to claim 1, wherein the biasing member is a torsion spring including a spiral portion having a spiral shape and a first end portion, the spiral portion is disposed away from the first roller in an intersecting direction intersecting a biasing direction in which the biasing member biases the first roller when viewed from an axial direction of the first roller, and the first end portion protrudes from one end of the spiral portion and presses against the first roller.

8. The medium conveying device according to claim 7, wherein the biasing member includes a second end portion that protrudes from another end of the spiral portion, and the adjustment member moves the second end portion in a circumferential direction of the spiral portion to move the spiral portion in the circumferential direction.

9. An image forming apparatus, comprising:

the medium conveying device according to claim 8; and an image forming section that forms an image on a recording medium conveyed by the medium conveying device.

10. An image forming apparatus, comprising:

the medium conveying device according to claim 7; and an image forming section that forms an image on a recording medium conveyed by the medium conveying device.

* * * * *